United States Patent [19]

Lautenschläger

[11] Patent Number: 5,308,205
[45] Date of Patent: May 3, 1994

[54] PLASTIC RETAINING PEG, PARTICULARLY FOR FURNITURE FITTINGS

[75] Inventor: Horst Lautenschläger, Reinheim, Fed. Rep. of Germany

[73] Assignee: MEPLA-Werke Lautenschlager GmbH & Co. KG, Reinheim, Fed. Rep. of Germany

[21] Appl. No.: 949,237

[22] PCT Filed: Mar. 23, 1992

[86] PCT No.: PCT/EP92/00637

§ 371 Date: Nov. 5, 1992

§ 102(e) Date: Nov. 5, 1992

[87] PCT Pub. No.: WO92/17706

PCT Pub. Date: Oct. 15, 1992

[30] Foreign Application Priority Data

Mar. 27, 1991 [DE] Fed. Rep. of Germany ....... 4110079
Jun. 10, 1991 [DE] Fed. Rep. of Germany ....... 4119047

[51] Int. Cl.⁵ .................... F16B 19/00; F16B 37/04
[52] U.S. Cl. ..................... 411/182; 411/510; 411/908; 411/913
[58] Field of Search ............ 411/182, 508, 509, 510, 411/908, 456, 913

[56] References Cited

U.S. PATENT DOCUMENTS

| | | | |
|---|---|---|---|
| 3,466,966 | 9/1969 | Brown | 411/510 |
| 3,494,244 | 2/1970 | Wayland | 411/510 |
| 4,381,633 | 5/1983 | MacLeod | 411/510 X |
| 4,579,492 | 4/1986 | Kazino et al. | 411/182 |
| 4,810,144 | 3/1989 | Martelli | 411/510 |
| 4,906,152 | 3/1990 | Kurihara | 411/182 |
| 5,065,490 | 11/1991 | Wivagg et al. | 411/182 X |

FOREIGN PATENT DOCUMENTS

| | | | |
|---|---|---|---|
| 0387391 | 9/1990 | European Pat. Off. | |
| 464574 | 1/1992 | European Pat. Off. | 411/510 |
| 1168666 | 12/1958 | Fed. Rep. of Germany | |
| 1475039 | 2/1969 | Fed. Rep. of Germany | |
| 2457022 | 6/1976 | Fed. Rep. of Germany | |
| 2457172 | 6/1976 | Fed. Rep. of Germany | |
| 2727962 | 1/1979 | Fed. Rep. of Germany | |
| 2736333 | 2/1979 | Fed. Rep. of Germany | |
| 8807139 | 11/1988 | Fed. Rep. of Germany | |
| 1317354 | 1/1963 | France | 411/510 |
| 440852 | 1/1968 | Switzerland | |

*Primary Examiner*—Neill R. Wilson

[57] ABSTRACT

Dowel-like retaining peg (10) of plastics material—particularly for fastening furniture fittings to articles of furniture—which may be fitted by pressing or driven into a bore (16). The retaining peg has an elongate peg portion (18) from whose outer peripheral surface a number of peripheral projecting ribs (20) extend radially, offset in the longitudinal direction of the peg and with a triangular cross-section tapering towards the exterior and defining a respective knife blade-like retaining ridge. Over the major portion of its longitudinal extent the peg portion (18) has a substantially smaller diameter with respect to the diameter (d) of the associated bore (16) and the peripheral annular projections (20) are constructed as annular disc-shaped, elastically deformable fins (20) which are integrally connected to the peg portion (18) and whose external diameter (D) is larger than the diameter of the associated bore (16).

11 Claims, 3 Drawing Sheets

PLASTIC RETAINING PEG, PARTICULARLY FOR FURNITURE FITTINGS

The invention relates to a dowel-like retaining peg of plastics material which may be fitted by pressing or driven into a bore, particularly for fastening furniture fittings to articles of furniture, with an elongate peg portion from whose outer peripheral surface a number of peripheral annular projections extend radially, offset in the longitudinal direction of the peg and with a triangular cross-section tapering towards the exterior and defining a respective knife blade-like retaining ridge.

Furniture fittings, for instance, are fastened by means of such plastic retaining pegs to the walls of articles of furniture. If the fittings or fitting members are of plastic and manufactured by an injection moulding method the retaining pegs can be directly integrally injection moulded on the fitting (DE-A 2457172; DE-A 2457022), whilst they are separately manufactured and connected, e.g. screwed, to the fittings which are to be fastened for the purpose of attachment to metallic fittings (DE-B 2727962). The retaining pegs are inserted into bores provided in the fastening region of the article of furniture, whereby a solid loadable fit is ensured e.g. by oversizing the peg diameter with respect to the diameter of the fastening bore. The retaining pegs can be pressed or driven into the associated fastening bore with a radial diameter reduction due to the elasticity of the plastic material which is used and/or the provision of partial longitudinal slots. As a result of peripheral annular projections of saw tooth-shaped cross-section which are provided on their peripheral surface a resistance to tearing out of the retaining pegs is achieved which exceeds the resistance to being pressed in since the peripheral retaining ridges of the saw tooth annular projections have the tendency when subjected to such tearing out forces to dig into the material of the wall of the bore. The resistance to tearing out which may be achieved is however not in many cases sufficient for the loads which occur in the course of time, since particularly with wooden materials a change in the dimensions of the wooden wall of the article of furniture and thus of the bore can occur—e.g. due to drying out or the absorbtion of moisture from the environment. Under high loads, instead of the pushed or driven pegs described above, retaining pegs are therefore also used which may be expanded after insertion into the associated fastening bore by means of a separate expanding body and thus, even when they have no or only a small oversize with respect to the diameter of the fastening bore, have an enlargeable diameter after insertion into the bore so that the necessary tight fit is ensured. Subsequent tightening in the event of looseness occurring as a consequence of an increasing diameter of the fastening bore caused by external influences is also possible with such expansible dowel-like retaining pegs. This high load-bearing ability and subsequent tightening ability are however bought at the expense of a more complex construction and thus an increase in expense of the retaining pegs. Furthermore, the solidity of the fit of the retaining pegs in the fastening bores which is actually achieved also depends on the expansion force which is individually exerted during the installation. For an optimally solid fit without damage to the bore wall a certain experience of the installer is thus also necessary which can nowadays no longer be assumed in all cases.

With this background it is the object of the invention so to develop the known retaining pegs which are retained in the fastening bore by their oversize that they can be installed simply and rapidly, even by inexperienced personnel, whereby a lastingly solid fit is to be achieved with an increased resistance to tearing out.

In accordance with the invention this object is solved if the peg portion has a substantially smaller diameter over the major portion of its longitudinal extent with respect to the diameter of the associated bore, if the peripheral annular projections are constructed as annular disc-shaped, elastically deformable fins which are integrally attached to the peg portion, and if the external diameter of the annular projections in the undeformed state is greater than the diameter of the associated bore. The fins which are dimensioned to have a substantially greater oversize with respect to the diameter of the fastening bore in comparison to the retaining ridges of sawtooth shape cross-section which are provided on the known retaining pegs deform the retaining peg is pressed or driven into the associated fastening bore into a part-spherical dished configuration whereby an elastic biasing force is stored in the fins which urges their retaining ridge radially outwardly, that is to say into the material of the bore wall. A withdrawing force directed out of the interior of the bore and exerted on the installed retaining peg attempts to deform the dished fins back into the original unstressed state whereby, however, the diameter of the fins increases and they dig further into the bore wall. That is to say, tensional forces which attempt to withdraw the retaining peg in accordance with the invention out of the bore result in an increase in the resistance of the retaining peg to withdrawal which is dependent on the strength of the force.

The fins forming the annular projections preferably have the triangular cross-section forming the pointed retaining ridge only in the outer edge region whilst they are otherwise of substantially flat surfaced construction in the undeformed state.

The sections of the peg portion remaining between each two successive fins in the longitudinal direction preferably merge into the respective connected flat surface of the adjacent fins with a transition surface which is concavely rounded in cross-section. Due to the rounding, the production of notch stresses in the transition region of the peg portion with the fins is avoided and thus the load-bearing ability is increased.

It is further convenient to adjust the strength of the sections remaining between the successive fins to correspond to the loads to be expected. Since the tensional loading in this peg portion reduces inwardly from the exterior when tensional forces occur, it is thus recommended to fabricate the sections of the peg portions with incrementally reducing diameter from the bore mouth end of the fastening bore towards the inner end of the bore.

In addition to as high as possible a resistance to tearing out of the fastening bore, an exact mounting of the retaining peg at right angles to the longitudinal central axis of the fastening peg is necessary, i.e. a fitting portion secured to a furniture wall by means of the retaining peg in accordance with the invention should also be held rigidly in the plane of the wall surface. This can be ensured in a convenient embodiment of the invention if the end section of the peg portion projecting beyond the uppermost fin provided at the bore mouth end, which then merges directly into the fitting portion to be secured, has an enlarged diameter in comparison to the diameters of the other peg sections which is only slightly smaller than the diameter of the associated fastening bore. The outermost fin on the retaining peg at the bore mouth end is thus substantially stiffer than the other fins whereby the retaining peg is centered as a whole in the associated fastening bore.

The fin connected to the peg end section at the bore mouth end conveniently has—to compensate for its reduced elastic deformability—a reduced oversize with respect to the diameter of the fastening bore in comparison to the other fins on the retaining peg.

When the retaining peg in accordance with the invention is intended for a component which is itself manufactured from plastics material, the peg portion is conveniently integrally connected to the plastic component. In the case of manufacture by an injection moulding method, the retaining peg or retaining pegs in accordance with the invention is or are thus simultaneously integrally moulded on during the manufacture of the plastic component.

When, on the other hand, the retaining peg is provided for the fastening of metallic components and thus must be separately manufactured, it is recommended that a central longitudinal bore open at the bore mouth end be provided in the peg portion in which the shaft of a fastening pin, preferably the threaded shaft of a fastening screw, may be anchored.

The longitudinal bore is conveniently so constructed that it gently tapers conically from the open bore mouth end in the direction towards the end remote from the bore mouth so that a fastening screw screwed into it digs ever deeper into the peg portion as it is screwed in to an increasing depth.

When fastening the retaining peg to a fitting portion by means of such a screw, this screw may thus initially be turned with a low screwing force after being introduced into the longitudinal bore, which force then increases with increasing depth of the screw. The screw fastening of the retaining peg in accordance with the invention to the component to be fastened also has the advantage that the fastened component can be removed from the underlying surface by unscrewing the screws out of the retaining pegs whereby the retaining pegs themselves then remain in the associated fastening bores.

The longitudinal central bore intended to receive such fastening screws can either be constructed as a blind bore terminating before the end surface of the peg portion remote from the bore mouth or it can pass right through the peg portion.

Even when the peg portion is integrally attached to a plastic component, it can be convenient to provide a longitudinal bore in the peg portion and in the plastic component which is open at least on the side of the plastic component remote from the peg portion so that the shaft of a retaining screw may be screwed into it or a dowel or splined peg may be pressed or driven into it. This retaining screw does not have the function of an expanding screw but constitutes a loadable connection of the peg portion to the plastic component so that the latter thus still remains firmly connected to an installation surface if the peg portion should have become separated from the plastic component—for instance as a result of repeated installation and removal.

The longitudinal bore is advantageously countersunk at its mouth end so that the head of the retaining screw does not project beyond the upper surface of the plastic component.

The invention will be described in more detail in the following description of three exemplary embodiments in conjunction with the drawings, in which.

Figure 1:
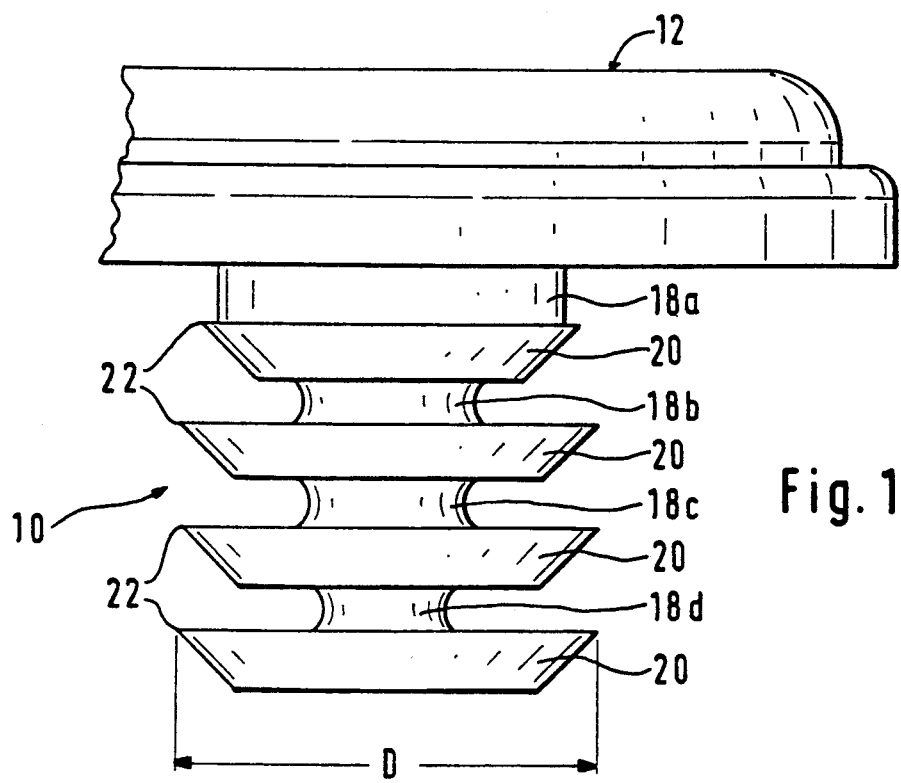
FIG. 1 is the side view of a retaining peg constructed in the manner in accordance with the invention and integrally injection moulded on a fitting member.
Figure 2:
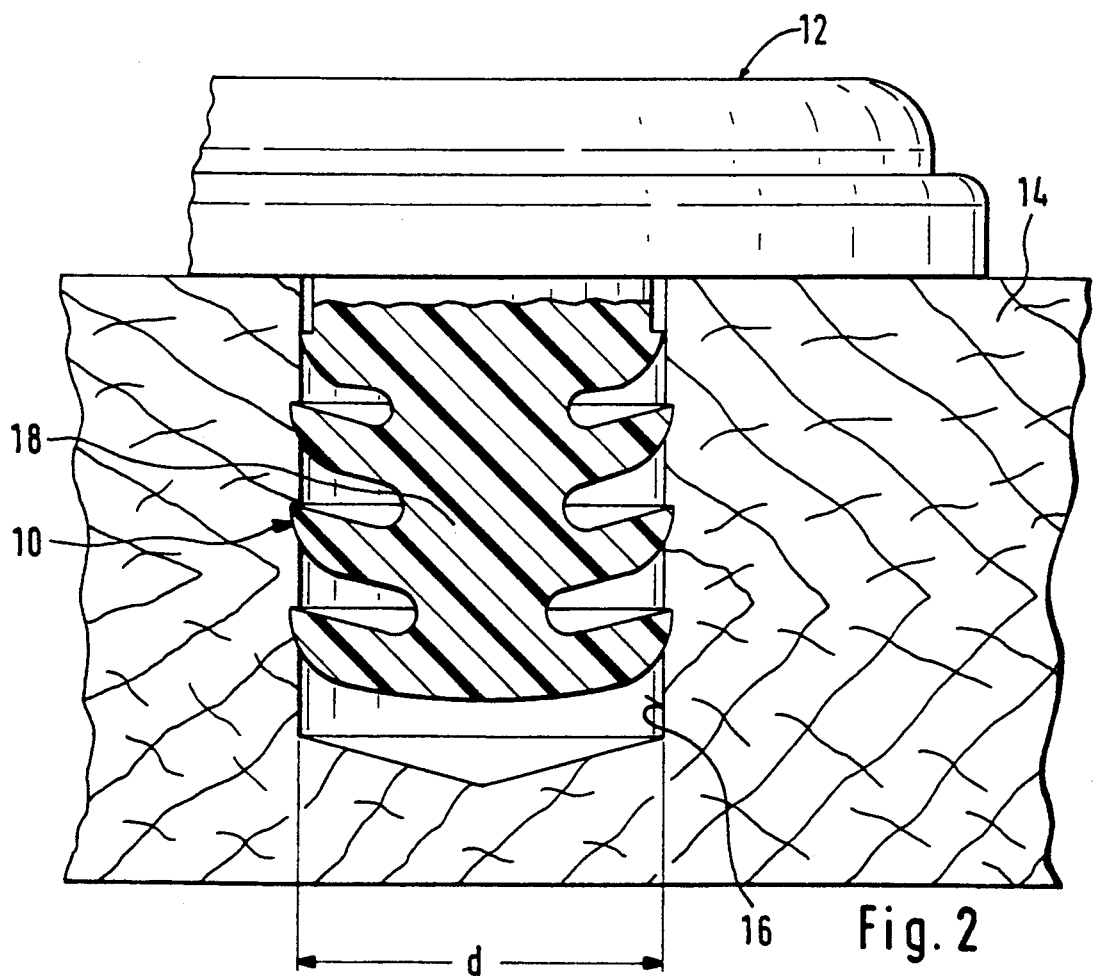
FIG. 2 is a central longitudinal sectional view of the retaining peg shown in FIG. 1 in the mounted position in a securing bore in the wall of an article of furniture.

Shown in FIGS. 1 and 2 is a first exemplary embodiment of a retaining peg in accordance with the invention which is designated as a whole with 10 and which may be integrally injection moulded on a furniture fitting member 12 of thermoplastic plastics material. The furniture fitting member 12, of which only a section carrying the retaining peg 10 is shown in the drawings, can, for instance, be a mounting plate or the lower portion of a mounting plate or even a hinge cup or fastening portion of a hinge cup of a furniture hinge.

The retaining peg 10 is provided in the illustrated case for fastening the furniture fitting member 12 to the surface of a furniture wall 14, for which purpose the wall 14 is provided with a fastening bore 16 constructed as a blind bore. The retaining peg 10 to be anchored in the bore 16 has an elongate peg portion 18 projecting from the underside of the furniture fitting member 12 opposed to the surface of the furniture wall 14, projecting from the peripheral surface of which peg portion is a number of annular disc-shaped, substantially flat fins 20 which terminate merely in their outer edge region in a knife blade-like retaining ridge whose edge directed towards the wall of the fastening bore 16 is directed obliquely outwardly towards the fastening surface of the furniture fitting member 12. The diameter of the peg portion 18 is—with the exception of the section 18a directly adjacent to the fitting member 12—substantially smaller than the diameter d of the fastening bore 16 whilst the diameter D measured over the retaining ridges 22 of the fins 20 is larger than the diameter d of the fastening bore. As a consequence of the relatively large difference in diameter between the diameters of the peg portion sections 18b, 18c and 18a, the fins separating these sections are not rigid but, when pressed into the fastening bore 16, dish into a part-spherical shape whilst reducing the diameter D—in the manner seen in FIG. 2. The spring force stored in the dished fins 20 attempts to return the fins 20 into the flat initial state again. The retaining ridges 22 engage the wall of the fastening bore 16 under a biasing force or even dig a little into the material of the furniture wall 14. The attempt to remove the furniture fitting member 12 forcefully from the furniture wall 14 increases the radial stress in the fins which thus dig further into the bore wall.

In order to equalise the axial stress acting in the sections 18b to 18d of the peg portion 18, the diameters of the peg portion sections are stepped so that they become incrementally smaller from the furniture fitting in the direction towards the free end of the retaining peg. It may further be seen in the drawings that the peg portions 18b to 18d each merge into the adjacent fins with a concave rounded shape in order to minimise the production of notch stressing when longitudinal forces act.

The section 18a of the peg portion mentioned above and provided between the uppermost fin 20 and the fitting member 12 has, on the other hand, a diameter which is only slightly smaller than the diameter d of the fastening bore 16. Accordingly, the uppermost fin adjacent to it is significantly stiffer than the remaining fins 20 since it is supported and stiffened by the section 18a over a larger region of its surfaces directed towards the furniture fitting. As a result of the greater stiffness, i.e. smaller deformability, of this uppermost fin 20 close to the fitting member, it is convenient to make its diameter somewhat smaller than the diameter D of the remaining fins 20 but slightly larger than the diameter d of the fastening bore 16.

Figure 3:
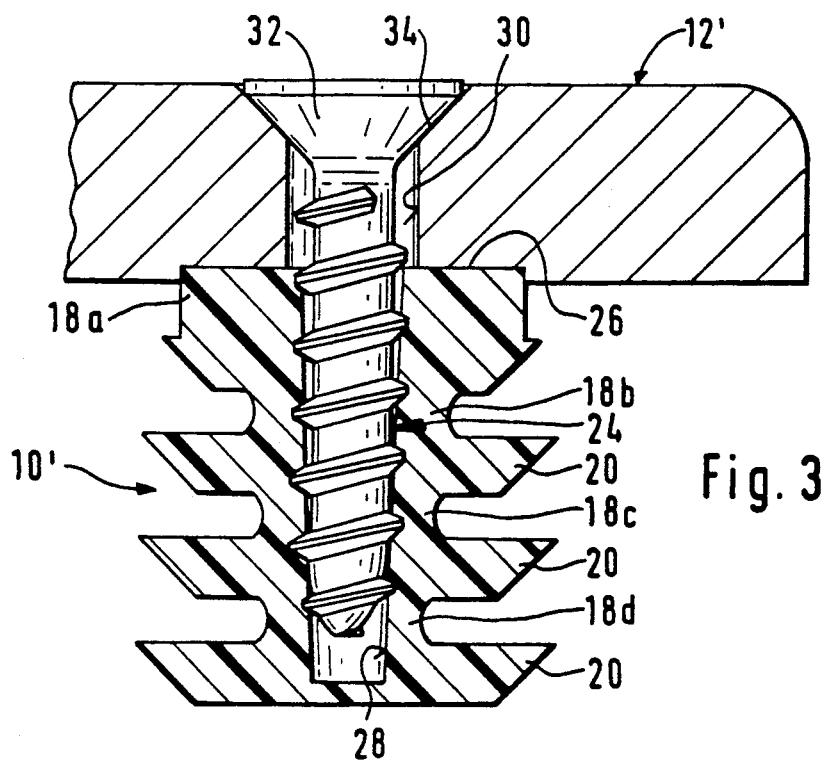
FIG. 3 is a sectional elevation of a second exemplary embodiment of a retaining peg in accordance with the invention screwed to a fitting member.
Figure 4:
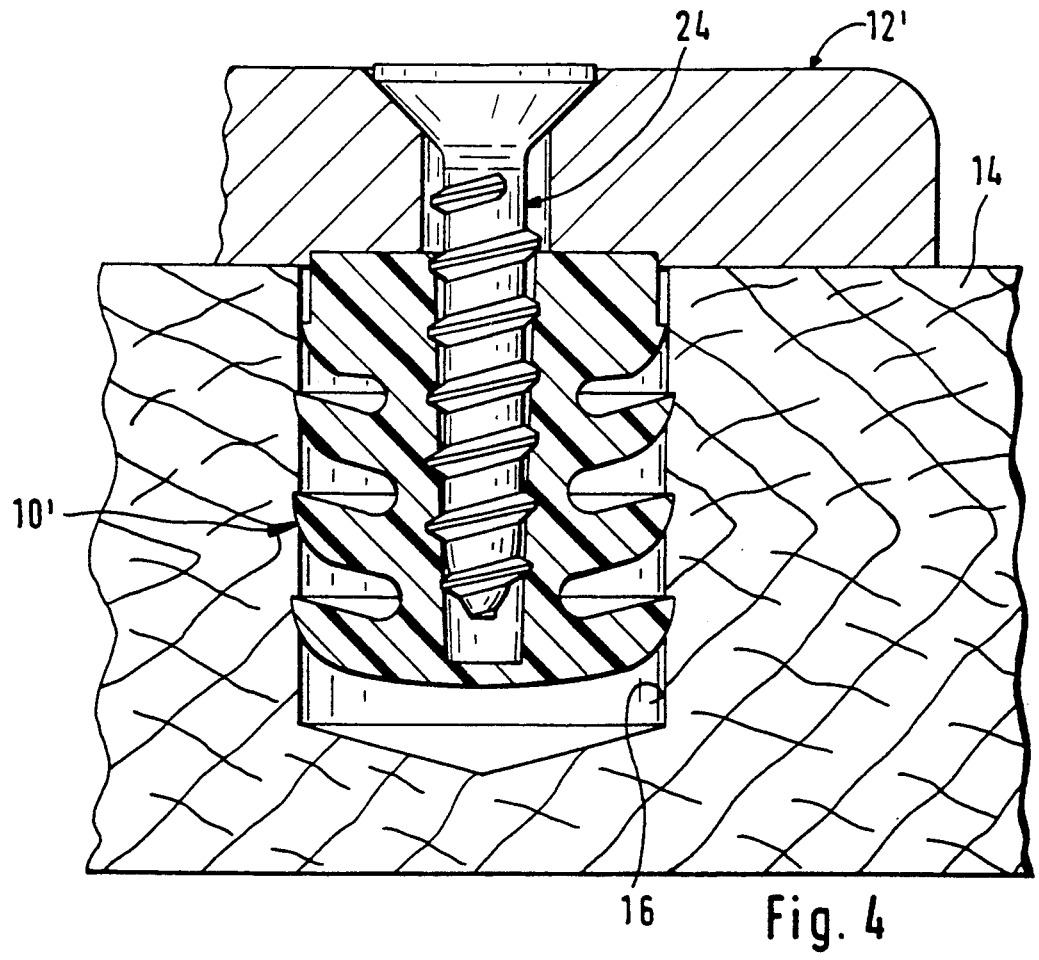
FIG. 4 shows the retaining peg illustrated in FIG. 3 in the predetermined installed position in an associated fastening bore.

FIGS. 3 and 4 show an exemplary embodiment of the retaining peg 10' which corresponds to the retaining peg 10 described in conjunction with FIGS. 1 and 2 in its basic construction and shape but differs from the latter only in that it is not connected integrally to the associated fitting member 12' but is manufactured separately and is connected to the fitting member 12' by a fastening screw 24. In order to avoid unnecessary repetition, only the modifications resulting from the separate manufacture and connection of the retaining peg 10' to the fitting member 12 will be described below whilst it is otherwise sufficient to refer to the preceding description relating to FIGS. 1 and 2, particularly as the same reference numerals are associated with the same parts of the retaining peg 10' in FIGS. 3 and 4 as with the corresponding parts of the retaining peg 10.

In the retaining peg 10' the section 18a of the peg portion 18 is provided at its upper end with a flat engagement or fastening surface 26 which engages the underside of the associated fitting member 12'. A central longitudinal bore 28 which is open at the fitting end receives the threaded shaft of the fastening screw 24 which engages in the fitting member 12' through a fastening bore 30 and bears with its head—shown in the drawing as a countersunk head 32—in a recess 34 in the fitting member 12.

The longitudinal bore 28 gently tapers conically from its end adjacent the fitting member. In the illustrated case the bore 28 is constructed as a blind bore, that is to say closed at the rear end of the retaining peg. If, in special cases, the fastening screw 24 connecting the retaining peg 10' to the fitting member 12' is to be extended so far that it additionally engages in the material of the furniture wall 14, the retaining peg 10' can also be manufactured with a continuous longitudinal central bore 28.

The third embodiment 10" of a retaining peg in accordance with the invention shown in FIGS. 5 and 6 appears at first glance merely to transfer the shape described in the exemplary embodiment described above with a fastening screw 24 to the exemplary embodiment described in connection with that in FIGS. 1 and 2. In fact, the fixing screw 24' provided in the third exemplary embodiment in place of the fastening screw 24 serves as a tear or shear protector for the peg portion 18 from the plastic fitting member 12, that is to say it constitutes an additional metal reinforcement for the retaining peg which receives impacts or blows occurring, for instance, during transport which would lead to tearing or shearing away of the retaining peg without such a reinforcement. Furthermore, the retaining screw 24' can also take over the function of the fastening screw 24 of the retaining peg 10' in FIGS. 3 and 4 if the originally integral connection of the actual peg portion with the fitting member 12 is deliberately or accidentally broken. The longitudinal bore 29 extends through the fitting member 12 into the peg portion whereby the section 29d of the longitudinal bore passing through the fitting member 12 has a diameter which is larger than the threaded shaft diameter of the retaining screw 24'. That is to say there is threaded engagement only between the section 29a of the longitudinal bore 29 extending within the peg portion and the threaded shaft of the retaining screw 24'. The transfer of the tensional forces, which occur during disassembly by levering off the fitting member 12, from the fitting member 12 into the peg portion 18 is thus effected via the head—conveniently received in the illustrated manner in a recess 29c in the fitting member 12—of the retaining screw 24' into its threaded shaft which, for its part, is in threaded engagement only with the section 29a. The transition region of the peg portion with the fitting is thus substantially relieved of tensional loads.

Figure 5:
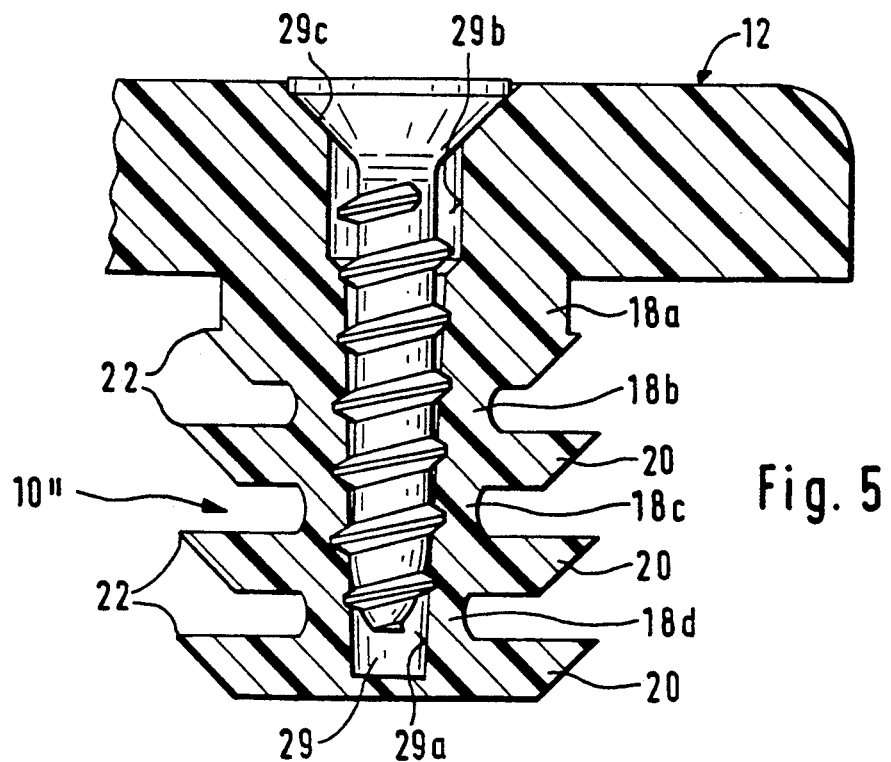
FIG. 5 is a sectional elevation of a third exemplary embodiment of a retaining peg in accordance with the invention integrally injection moulded on a fitting member.
Figure 6:
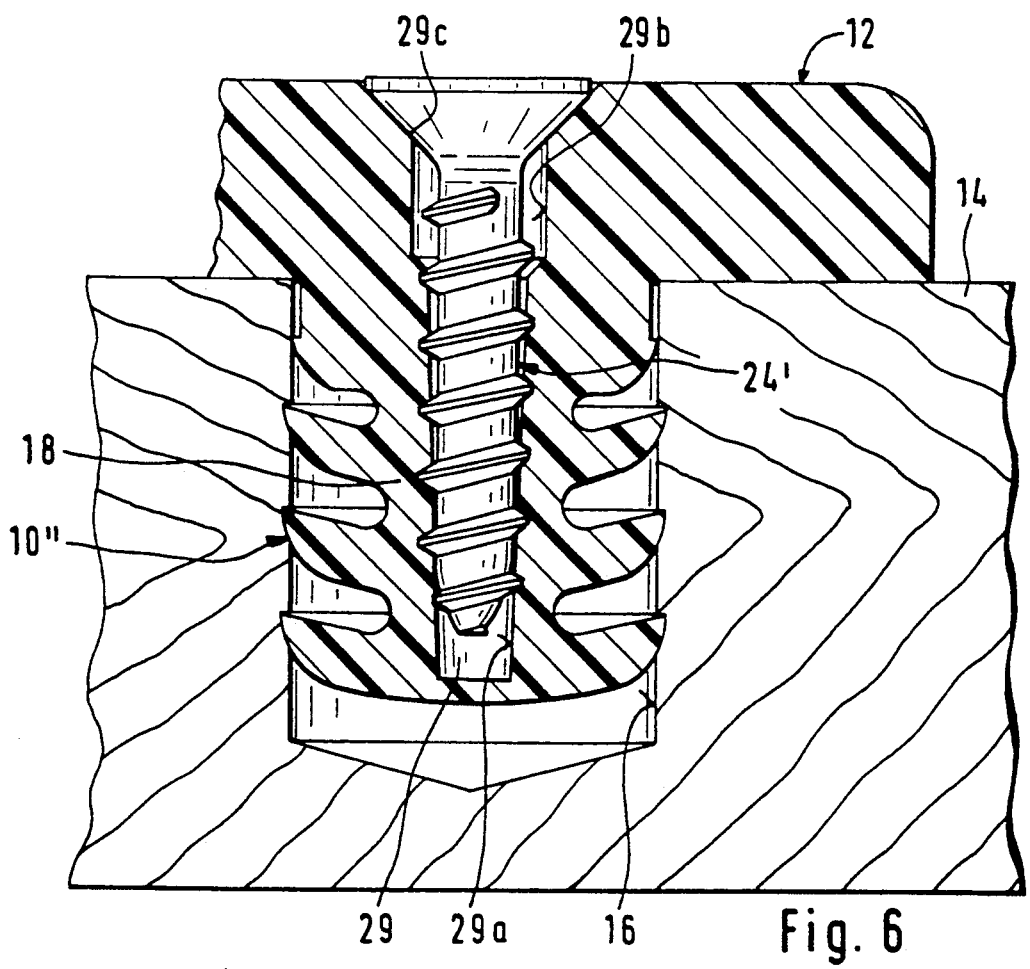
FIG. 6 shows the retaining peg illustrated in FIG. 5 in the mounted position in a fastening bore in the wall of an article of furniture.

Instead of the retaining screw 24' with a conical countersunk head illustrated in FIGS. 5 and 6, a retaining screw can also be used with a cylindrical screw head, whereby the recess. 29c is then conveniently of complementary cylindrical construction. If the security of the retaining peg 10" against shear stresses is doubtful, an unthreaded metal dowel pin or splined pin can also be used instead of the retaining peg 24'.

I claim:
1. A dowel-like retaining peg of plastics material which may be fitted by pressing or driven into a bore, particularly for fastening a furniture fitting member (12) to an article of furniture, with an elongate peg portion from whose outer peripheral surface a number of peripheral annular projections extend radially, offset in the longitudinal direction of the peg and with a triangular cross-section tapering towards the exterior and defining a respective knife blade-like retaining ridge, wherein the furniture fitting member is plastic and the peg portion (18) has a substantially smaller diameter over the major portion of its longitudinal extent with respect to the diameter (d) of the associated bore (16), that the peripheral annular projections are construed as annular disc-shaped, elastically deformable fins (20) which are integrally attached to the peg portion (18), and that the external diameter (D) of the annular projections in the undeformed state is greater than the diameter (d) of the associated bore (16), said retaining peg being integrally connected to the plastic furniture fitting member (12), said peg portion (18) and said plastic furniture fitting member (12) have a longitudinal bore (29) which is open on the side of the furniture fitting member (12) remote from the peg portion and into which the shaft of a retaining screw (24') is screwed, said retaining peg having a section (29c) of a longitudinal bore extending within the peg portion (18), said peg portion having said longitudinal bore (29) which has a free diameter that is smaller than the external diameter of the threaded shaft of the retaining screw (24') and that the section (29b) of said longitudinal bore (29) extending within the plastic component 912) has an oversized free diameter with respect to the external diameter of the threaded shaft.

2. Retaining peg as claimed in claim 1, wherein said peg has a section (29a) extending within the peg portion (18) the longitudinal bore (29) has a free diameter which is smaller than the external diameter of the threaded shaft of the retaining screw (24') and that the section (29b) of the longitudinal bore (29) extending within the plastic component (12) has an oversized free diameter with respect to the external diameter of the threaded shaft.

3. Retaining peg as claimed in claim 1, wherein the longitudinal bore (29) is provided at its mouth with a recess (29c).

4. Retaining peg as claimed in claim 1, wherein the sections (18b;18c;18d) of the peg portion (18) remaining between each two successive fins (20) in the longitudinal direction merge into the respective connected flat surface of the adjacent fins (20) with a transition surface which is concavely rounded in cross-section.

5. Retaining peg as claimed in claim 1, wherein the peg portion (18) has a central longitudinal bore (28) which is open at the bore mouth end in which the shaft of a fastening pin, preferably the threaded shaft of a fastening screw (24), may be fastened.

6. Retaining peg as claimed in claim 5, wherein the longitudinal bore (28) gently tapers conically from the open bore mouth end in the direction of the end remote from the bore mouth.

7. Retaining peg as claimed in claim 5, wherein the longitudinal bore (28) is constructed as a blind bore terminating before the end surface of the peg portion (18) remote from the bore mouth.

8. Retaining peg as claimed in claim 5, wherein the longitudinal bore (28) passes wholly through the peg portion (18).

9. A dowel-like retaining peg of plastics material which may be fitted by pressing or driven into a bore, particularly for fastening a furniture fitting member (12) to an article of furniture, with an elongate peg portion from whose outer peripheral surface a number of peripheral annular projections extend radially, offset in the longitudinal direction of the peg and with a triangular cross-section tapering towards the exterior and defining a respective knife blade-like retaining ridge, wherein the furniture fitting member is plastic and the peg portion (18) has a substantially smaller diameter over the major portion of its longitudinal extent with respect to the diameter (d) of the associated bore (16), that the peripheral annular projections are construed as annular disc-shaped, elastically deformable fins (20) which are integrally attached to the peg portion (18), and that the external diameter (D) of the annular projections in the undeformed state is greater than the diameter (d) of the associated bore (16), said retaining peg being integrally connected to the plastic furniture fitting member (12), said peg portion (18) and said plastic furniture fitting member (12) have a longitudinal bore (29) which is open on the side of the furniture fitting member (12) remote from the peg portion and into which the shaft of a retaining screw (24') is screwed, said fins (20) forming the annular projections only have the triangular cross-section forming the retaining ridge (22) in the outer edge region and are otherwise of substantially flat surfaced construction in the undeformed state, and the sections (18b; 18c; 18d) of the peg portion (18) remaining between each two sucessive fins (20) in the longitudinal direction have a diameter which decreases incrementally from the bore mouth end of the fastening bore (16) to the inner end of the bore.

10. Retaining peg as claimed in claim 9, wherein the end section (18a) of the peg portion (18) projecting beyond the uppermost fins (20) provided at the bore mouth end has an enlarged diameter in comparison to the diameters of the remaining peg sections (18b;18c;18d) which is only slightly smaller than the diameter (d) of the associated fastening bore (16).

11. Retaining peg as claimed in claim 9, wherein the fin (20) connected to the uppermost peg end section (18a) at the bore mouth end has a reduced oversize with respect to the diameter (d) of the fastening bore (16) in comparison to the remaining fins (20) on the retaining peg (10;10').

* * * * *